(12) United States Patent
Tommasini et al.

(10) Patent No.: US 10,881,491 B2
(45) Date of Patent: Jan. 5, 2021

(54) DENTAL LIGHT CURING DEVICE

(71) Applicant: Ivoclar Vivadent AG, Schaan (LI)

(72) Inventors: Dario Tommasini, Mastrils (CH);
Bruno Senn, Gais (CH)

(73) Assignee: Ivoclar Vivadent AG, Schaan (LI)

( * ) Notice: Subject to any disclaimer, the term of this patent is extended or adjusted under 35 U.S.C. 154(b) by 226 days.

(21) Appl. No.: 15/533,411

(22) PCT Filed: Feb. 3, 2016

(86) PCT No.: PCT/EP2016/052296
§ 371 (c)(1),
(2) Date: Jun. 6, 2017

(87) PCT Pub. No.: WO2016/124650
PCT Pub. Date: Aug. 11, 2016

(65) Prior Publication Data
US 2018/0263745 A1    Sep. 20, 2018

(30) Foreign Application Priority Data

Feb. 6, 2015 (EP) .................................... 15154217

(51) Int. Cl.
*A61C 19/00* (2006.01)
*A61C 13/15* (2006.01)
(Continued)

(52) U.S. Cl.
CPC .......... *A61C 19/004* (2013.01); *G01J 1/0425* (2013.01); *G01J 1/4228* (2013.01); *G01J 1/4257* (2013.01); *G01J 2001/4252* (2013.01)

(58) Field of Classification Search
CPC .... A61C 19/004; G01J 1/0425; G01J 1/4257; G01J 1/4228; G01J 2001/4252
(Continued)

(56) References Cited

U.S. PATENT DOCUMENTS 7,766,654 B2    8/2010  Plank et al.
2006/0240376 A1*  10/2006  Plank .................. A61C 19/003
                                                    433/29

(Continued)

FOREIGN PATENT DOCUMENTS

EP          0563953 A2    10/1993

*Primary Examiner* — Matthew M Nelson
(74) *Attorney, Agent, or Firm* — Ann M. Knab; Thad McMurray

(57) ABSTRACT

The invention relates to a light curing device comprising a light source that is arranged in the hand-held light curing device and has in particular a plurality of mutually adjacent chips which are arranged next to one another and form a light source and in front of which a light guiding element extends. The light curing device also comprises at least one sensor, which is sensitive to light in the emission wavelength range of the light source, and a control device for controlling the light source during the polymerization process, the sensor being connected to the control device. The control device continuously or at least periodically monitors the output signal of the sensor during the polymerization process and adapts the light output and/or the polymerization time in the event of a reduction of the output signal. The control device adds up the reflected radiation detected via the light exit surface (10) in order to calculate a possible location deviation, and the light exit surface (10) of the light guide is larger than or equal in size to the largest dental restoration (12) to be cured, the light exit surface having a cross-sectional area of more than 1 cm² in particular.

22 Claims, 3 Drawing Sheets

(51) Int. Cl.
*G01J 1/42* (2006.01)
*G01J 1/04* (2006.01)

(58) Field of Classification Search
USPC .......................................................... 433/29
See application file for complete search history.

(56) References Cited

U.S. PATENT DOCUMENTS

| | | | | |
|---|---|---|---|---|
| 2008/0102417 A1* | 5/2008 | Jung | .................... | A61B 5/4547 |
| | | | | 433/29 |
| 2008/0274436 A1* | 11/2008 | West | .................... | A61C 19/004 |
| | | | | 433/29 |
| 2009/0114844 A1 | 5/2009 | Plank et al. | | |
| 2010/0003633 A1* | 1/2010 | Senn | .................... | A61C 19/004 |
| | | | | 433/29 |
| 2010/0140450 A1* | 6/2010 | Duret | .................... | A61C 19/003 |
| | | | | 250/205 |

* cited by examiner

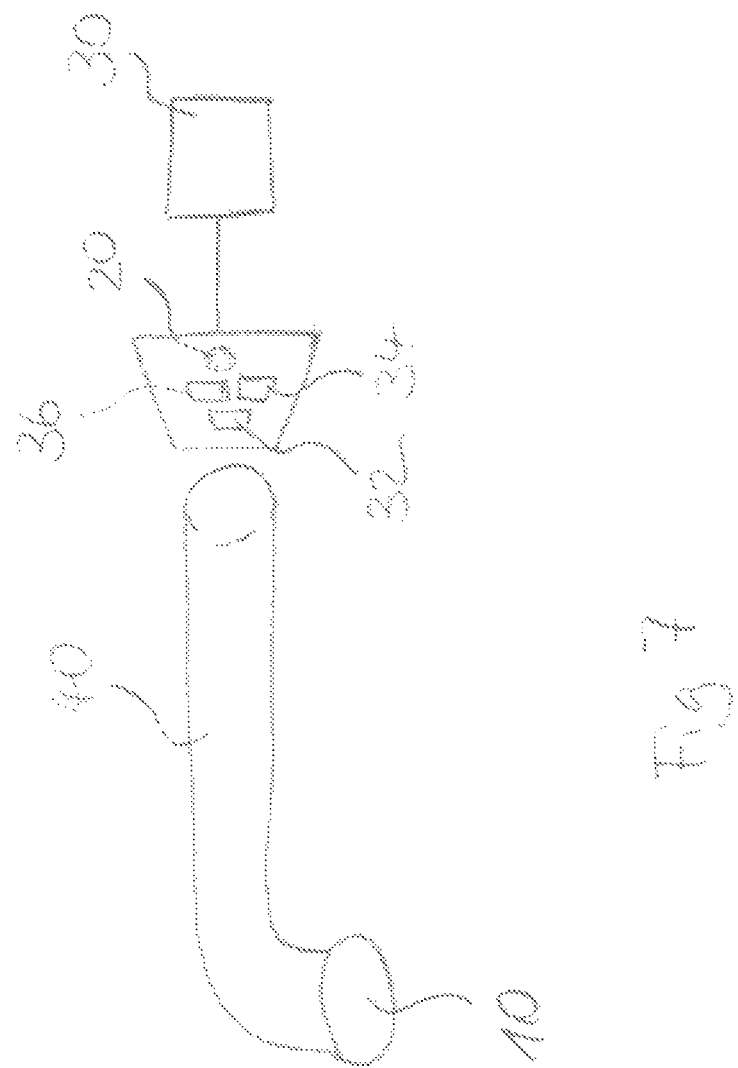

DENTAL LIGHT CURING DEVICE

CROSS-REFERENCE TO RELATED APPLICATIONS

This application is a National Stage application of International patent application PCT/EP2016/052296 filed on Feb. 3, 2016, which claims priority to European patent application No. 15154217.2 filed on Feb. 6, 2015, the disclosures of which are incorporated herein by reference in their entirety.

TECHNICAL FIELD

The invention relates to a light curing device having a light source that is arranged in a hand-held light curing device and has a plurality of mutually adjacent chips which are arranged next to one another and form a light source and in front of which a light guiding element extends, comprising at least one sensor, which is sensitive to light in the emission wavelength range of the light source, and comprising a control device for controlling the light source during the polymerization process, the sensor being connected to the control device.

BACKGROUND OF THE INVENTION

Light curing devices for the polymerization of dental materials have been known for a long time. While halogen lamps and thus a large light emission spectrum which reached into the infrared region were still used in the 90s in some cases, already around the year 2000 light curing devices have become established which are based on LED chips and often emitted light with an emission maximum of about 470 nm, that is to say substantially blue light.

The polymerization is effected when a photoinitiator—for instance camphor quinone—which matches the emission maximum triggers the polymerization reactions. This can be carried out stationary, that is to say in a light curing device fixed in place for curing, for instance, denture teeth carriers, but also in many cases by means of a suitably configured hand-held device with the help of which, for instance, dental restorations may be polymerized at natural teeth of a patient.

Here, one might think, for instance, of repair works at prostheses which may, of course, be carried out extracorporeally.

Hand-held devices of this type are used to a large extent, and in the course of decades a control device suitable for this purpose has become established which controls the polymerization time based on presettings made by the dental technician or the dentist—depending on the size of the dental restoration to be polymerized—but also at least partially based on device-specific presettings.

Furthermore, different methods have become known to detect the emitted radiation. In this respect, the solution according to DE 10 2007 052 643 A1 may be mentioned, for instance.

But attention should also be drawn primarily to devices which detect the reflection of the bodies irradiated by the light curing device. First of all, the document DE 10 2005 019 386 B4 must be mentioned which is prevailing in the dental field. While the solution according to DE 92 04 621 U1 relates to the amount of light reflected by the object and wants to detect this amount of light, the solution according to the mentioned document DE 10 2005 019 386 B4 detects the radiation in the wavelength range of between 800 nm and 10,000 nm and can thus already make certain statements on the polymerization which has been carried out.

However, it has become evident that the detection of the reflected radiation and the supply thereof to the control device is not sufficient to achieve completely reliable results of polymerization.

In this connection, it should be noted additionally that in case of insufficient polymerization the problem arises that free radicals which are said to favor the occurrence of cancer are not completely bound, but that, on the other hand, based on a curing process of a larger amount of material which has been carried out too intensively shrinkage of the cured material is favored which promotes the development of marginal gaps.

SUMMARY OF THE INVENTION

Thus, the invention is based on the task of providing a light curing device according to the preamble of claim 1, which is improved with regard to the restoration results in the polymerization process, particularly with hand-held light curing devices, without the need for particularly elaborate test series or other evaluation measures.

This task is inventively solved by attached claims. Advantageous developments may be taken from the subclaims.

According to the invention it is particularly favorable that the inventive device detects and evaluates the light dose which actually arrives at the dental restoration in a surprising and and practically automatic manner. Apparently, the main cause for defective polymerization products is not the wrong choice of polymerization time, but the unfavorable handling of the light curing device. If, for instance, only part of the restoration surface is irradiated by the irradiation end of the light curing device, for instance, due to an accidental movement of the light curing device, the user often does not notice this without the invention, but receives the signal "end of polymerization" from the hand-held light curing device, after the necessary polymerization cycle lasting for instance 10 seconds has been finished.

According to the invention, a change of the reflected light signal is now detected:

Typically, the surface of the dental restoration changes during the curing process and particularly becomes more opaque.

If the change of the detected signal of the reflected radiation now adopts a course typical for curing, the control device detects that the polymerization process has been carried out successfully indeed. However, if an interference signal is detected during the curing process, that is to say a change of the typical course of the reflected radiation in the polymerization cycle, this is due to a change in position of the light curing device with regard to the dental restoration, as has been found out according to the invention. This can be a translational movement transversely to the axis of the light guide or the light curing device, or also to the normal of the light exit surface, but also an inclination, that is to say an angular deviation.

If, for instance, part of the emitted light energy is directed to the side of the tooth containing the dental restoration, that is to say to the mouth cavity, it is typically not reflected such that the reflected radiation is reduced considerably in case of a change in position in this direction.

If, on the other hand, the light exit surface leaves the area of the dental restoration in the direction of a healthy tooth, typically the reflected radiation is even increased—in case of saliva wetting—such that the output signal of the sensor for the reflected radiation even increases.

According to the invention, it is also crucial that the light exit surface ensures uniform output of light over its entire transversal extension; in an advantageous configuration, the variation of the output of light transversely to the light exit surface is relatively low, preferably in such a way that the outer areas of the light exit surface have a higher light output that the inner areas, provided there are deviations, after all.

According to the invention, it is further crucial that suitable measures are taken if an error case is detected, that is to say if the output signal of the sensor is changed. This includes outputting a position correction signal to the treating person, increasing the light output—if a corresponding control reserve is available—and/or prolonging the polymerization cycle.

Preferably, an alarm signal with regard to the position correction is output in any case such that the treating person checks if the restoration has cured satisfactorily using a suitable dental device after the polymerization cycle has been finished; if this is not the case as the location deviation has been too severe, the treating person is provided with the instruction to carry out post-curing at this position.

Surprisingly, the inventive detection of the change of the reflection signal in its temporal course by means of a "defect" makes it possible to detect if a location deviation is present, and the polymerization cycle may be carried out reliably and in an interference-free manner with the help of the invention, even without the steady hand of the treating person which is not always ensured in everyday practice.

Advantageously, it is also possible to increase the light output in adaptation to the measured polymerization result. For instance, this can be realized in such a way that the measured reflected radiation is regulated constantly. This requires an increase in the emitted light output while the light is emitted.

In this connection it is particularly favorable that uniform curing may be carried out with the aid of such a curing process, as typically the solidification of the surface of the dental restoration reduces the passage of the light output into deeper layers, which can be compensated by an advantageous configuration of the invention.

The misalignment of the light exit surface with regard to the dental restoration may typically be detected and also—at least partially—compensated for by the invention. This can be carried out particularly favorably by evaluating the integral over the emitted light output, as, according to the invention, the light output is added up to calculate a potential positional deviation.

It is to be understood that, here, positional deviations are not limited to the mere translational area, but are to include also a potential angular deviation, for instance by 20°, between the surface of the restoration and the light exit surface; in case of such a change it is typically recommended to prolong the polymerization cycle which will then be able to compensate for the partially defective output of light.

In a further advantageous configuration it is provided to provide more than one light sensor, for instance three light sensors, distributed around the circumference of the LED chips at the light curing device. If a light guide is used, but also in case of a direct attachment to the tip of the light curing device, that is to say adjacent to the light exit surface, the reflected radiation is then also detected in a spatially selective manner. If the detection shows, that, for instance, one of the output signals of the sensors is reduced significantly, while the other two signals remain at unchanged levels, a position correction instruction may be derived from this, which, for instance, indicates that the exit surface of the light curing device is to be shifted in the opposite direction of the position of the sensor with the reduced signal.

BRIEF DESCRIPTION OF THE DRAWINGS

Further advantages, details and features may be taken from the following description of an exemplary embodiment of the invention in conjunction with the drawings, in which:

FIG. 7 shows a light curing device in accordance with the invention.

DETAILED DESCRIPTION OF THE INVENTION

Figure 1:
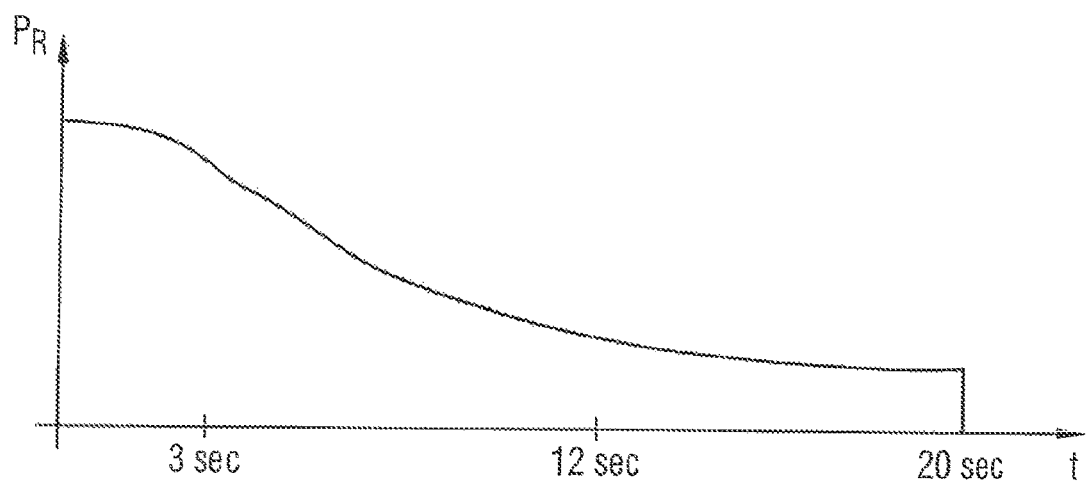
FIG. 1 shows a schematic curve of reflected radiation detected by at least one sensor and fed to the control device, in correspondence with the output signal of the sensor in one embodiment of an inventive light curing device.

A light curing device shown in FIG. 7 includes a light source arranged as a plurality of LED lights or chips 32, 34, 36, a sensor 20, control device 30, a light guide 40 and a light exit 10.

The reflected light radiation $P_R$ illustrated in FIG. 1 displays the output signal of the sensors in an added-up manner, said sensors detecting the light radiation reflected by the radiation surface.

For this purpose, the associated light curing device preferably comprises a plurality of LED chips which are arranged in one plane next to one another. The LED chips are surrounded by reflectors which can also be monolithic and serve to feed the emitted light to a light entry surface of a light guide.

A plurality of sensors are arranged on the plane of the LED chips, which sensors are connected with the light entry surface of the light guide via light guiding optics, wherein individual optical fibers may also be provided, respectively.

In this modified embodiment the sensor optics, as a specific optical fiber, extends through the light guides.

At the opposite, distal end of the light guide a light exit surface is provided, and at the edges of the light exit surface several sensor fields are arranged, preferably uniformly distributed around the circumference of the light exit surface, which, in case of the incidence of light, guide the light which is incident thereat rearward though the light guide and to the sensors. In order to achieve this, specific optical fibers are preferred which also take into account the sensitivity spectrum of the sensors.

In the present embodiment, the light guide is cranked at the end in a way known per se, for instance at an angle of 45°, wherein, as an alternative, it is also easily possible to use a straight light guide. The light guide comprises a diameter of 10 mm or even 12 mm, and as it is substantially cylindrical the light exit surface amounts to 1.13 $cm^2$—in case of a light guide with a diameter of 12 mm—minus the added-up sensor surface of the sensors.

If necessary, on the input side of the light guide an additional homogenization element may be provided which homogenizes the light input of the LED chips into the light guide such that there is a brightness difference across the light exit surface of considerably less than 50%.

In the exemplary embodiment illustrated, the light sources are operated on reserve such that it is possible without doing any harm to increase the supplied electric power—and thus the emitted light output, for instance for 20 seconds. In the illustration according to FIG. 1, the LED chips initially emit constant light output, for instance, 80% of the nominal output. At the start of the curing process the entire reflected radiation is emitted in the illustration according to FIG. 1, as in this state the dental restoration still comprises a viscous aggregate state, and thus a high degree of reflectivity.

In case of a total duration of the polymerization cycle of, for instance, 20 seconds, this degree of reflectivity continuously decreases from approximately 3 seconds, as then a solidified surface typically forms on the dental restorations whose reflection properties are smaller due to the increasing microroughness. The microroughness—and thus the degree of reflectivity—of the dental restoration decreases in the exemplary embodiment illustrated until approximately 12 seconds. The polymerization cycle is not yet finished at this point in time as particularly the lower layers or areas of the dental restoration still need to be cured.

Curing is only finished at the point in time of t=20 seconds.

During this time the dentist—or dental technician—has held the light exit surface over the dental restorations in such a way that the light radiation impinges thereon vertically, if possible. In this respect, the normal of the light exit surface should be as parallel as possible to the normal of the dental restoration surface.

This is also the reason why light guides for dental light curing devices which are configured as hand-held devices are often cranked, wherein it is to be understood that crank angles larger than 45° are also possible.

However, a slight inclination of the normal of the light exit surface relative to the normal of the dental restoration is also uncritical; in case of an inclination angle of, for instance, 20° the share of fully reflected radiation relative to refracted radiation which enters the dental restoration is changed only insignificantly. As a matter of fact, this also holds true equally for cusps and fossae on the occlusal surface of the dental restoration which also comprise inclinations of the normal relative to the normal of the light exit surface.

While, according to this, the inclination angle is relatively uncritical for a successful curing process of the dental restoration, the problems are largest when the dentist or dental technician slips off, as it were, or at least partially shifts the light exit surface to the side during the polymerization process, wherein to the side refers to a shift both in the palatal/lingual, in the vestibular and also in the mesial or distal direction, in case of a dental restoration which extends at least partially in the occlusal direction.

Figure 2:
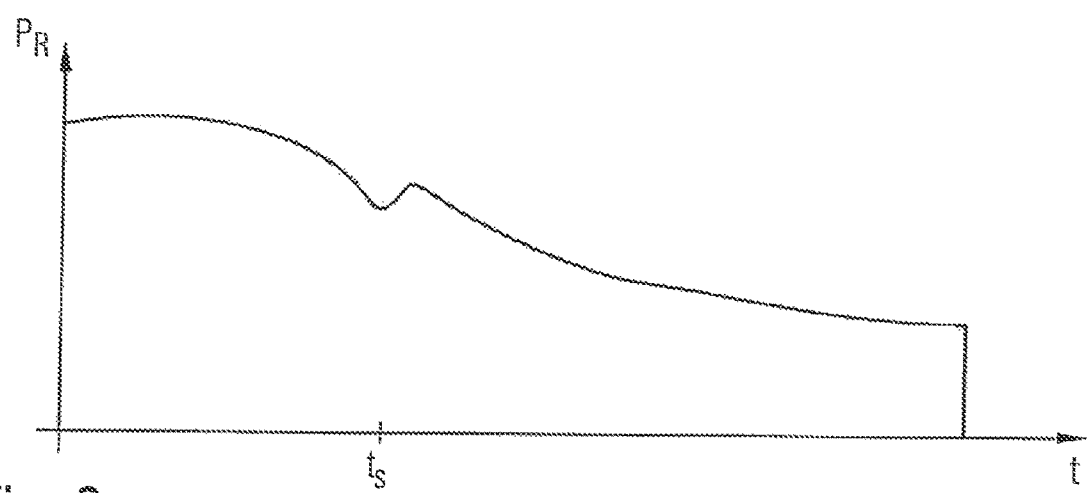
FIG. 2 shows the curve according to FIG. 1, however, wherein interference occurs at the point in time $t_S$.

According to the invention, the light exit surface is initially enlarged such that it is ensured that it always completely covers the light-receiving surface of the dental restoration even in case of a slight misalignment. In case of the output signal of the sensors illustrated in FIG. 2—in accordance with the measured reflected radiation—there has been a shift, for instance, in the mesial direction. There, a sensor detects a heavily polished surface, for instance a natural tooth or a porcelain crown. This leads to an increase in the added-up output signal of the sensors at the point in time of interference $t_S$, in accordance with the cusp illustrated in the Figure.

As the shift is only very small, the polymerization cycle is maintained but still an alarm signal is output in order to indicate to the treating person that it may be useful to carry out improvement or possibly correction work.

Figure 3:
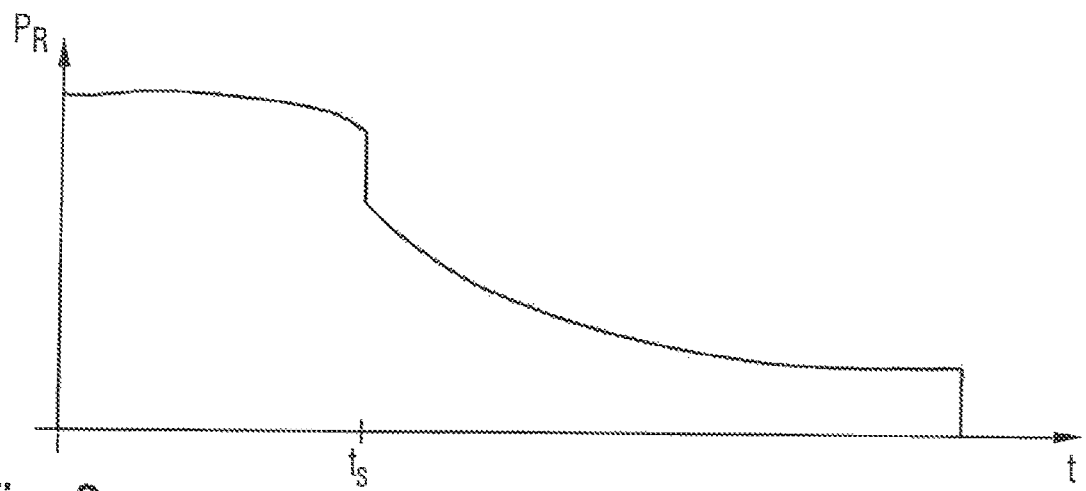
FIG. 3 shows the curve according to FIG. 1, wherein interference different from that in FIG. 2 occurs at the point in time $t_S$.

By way of contrast, in case of the situation according to FIG. 3 at the point in time of interference $t_S$ there has been a shift in the direction of the mouth cavity. Thus, at least one of the sensors does not detect a signal any longer and thus its output signal decreases, leading to the illustrated drop of the reflected light output at the point in time $t_S$.

Figure 4:
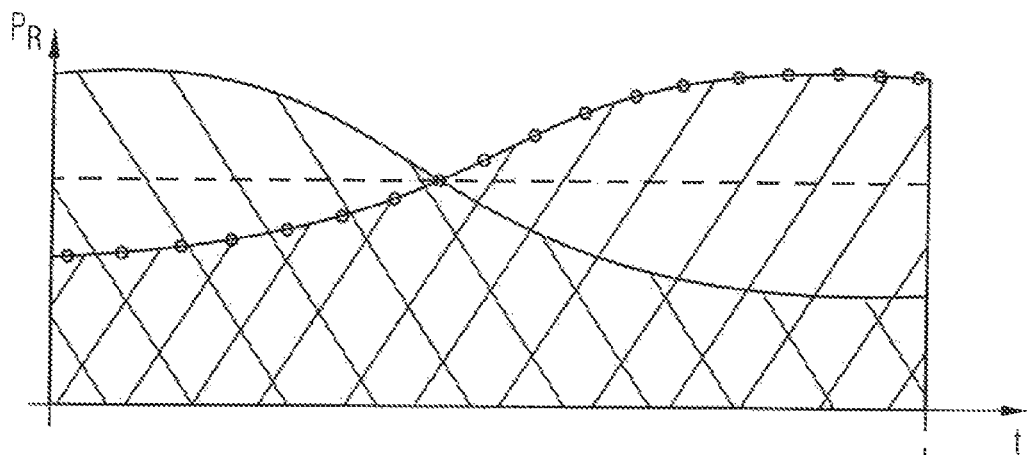
FIG. 4 shows a schematic illustration of the light output increased to compensate for the surface curing.

It is apparent from FIG. 4 how the light output may be increased advantageously to compensate for the surface solidification. Again, the output signal of the sensor(s) is illustrated as a solid line which has the shape as already mentioned. In order to compensate for the decrease of effectiveness of the radiation in spite of the penetration constraint due to the reduction of the transmissivity of the polymer as it is polymerized, the light output is increased symmetrically in accordance with the dotted line such that, in total, the measured reflective power assumes the shape of the dotted curve illustrated schematically.

Figure 5:
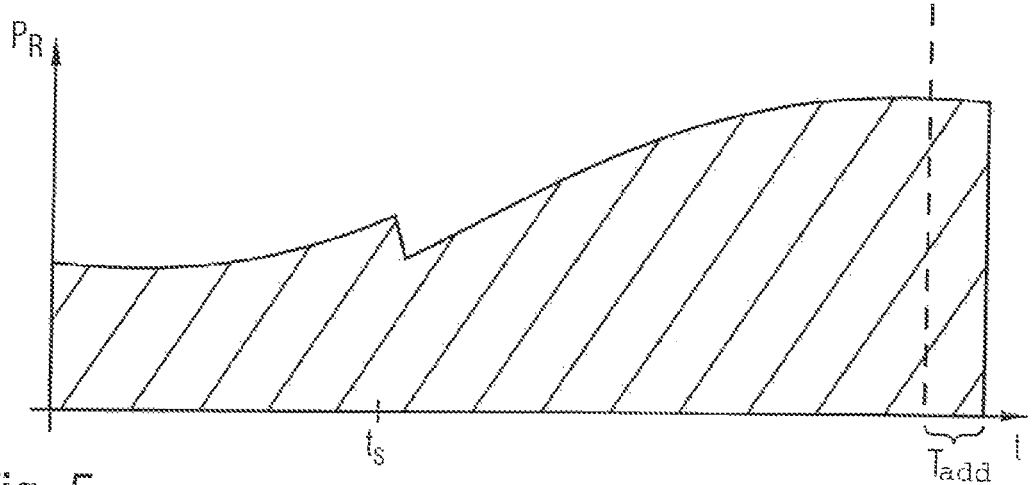
FIG. 5 shows the curve of the light output according to FIG. 4 wherein, however, interference occurs at the point in time $t_S$.

According to FIG. 5 an interfering displacement of the light exit surface above the dental restoration is assumed at the point in time of interference $t_S$. Resulting from a comparison of FIG. 4 and FIG. 5, the polymerization cycle is prolonged by a period of time $T_{add}$. Its length depends on the reduction of the reflective power.

It is to be understood that instead it is also possible to increase the light output by means of the control reserve, unless it has already been depleted by the measure according to FIG. 4.

Figure 6:
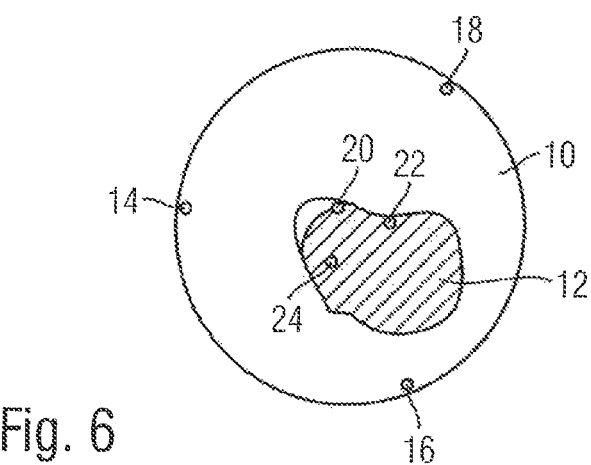
FIG. 6 shows a schematic illustration of the light exit surface relative to a dental restoration at an occlusal surface.

From FIG. 6 an exemplary arrangement of the sensitivity fields of the sensors at the light exit surface 10 is apparent. Additionally, the dental restoration 12 is illustrated in a super-imposed manner in FIG. 6, which indicates that the light exit surface is considerably larger, for instance twice as large as the surface of the dental restorations 12 in the vertical projection.

In the exemplary embodiment illustrated three sensors 14, 16 and 18 are arranged on the outer circumference of the light exit surface 10, and additionally three sensors 20, 22 and 24 close to the center. As is apparent from the exemplary embodiment illustrated, the sensor fields 20 to 24 detect immediately the area of the dental restoration 12, while the sensor fields 14 to 18 act to the outside thereof. Adding them up ensures that the dental restoration is also always detected at least partially by one of the sensor fields.

It is to be understood that a differentiation between different sensor fields and respective sensors may also be evaluated additionally such that the exact position of the dental restoration 12 below the light exit surface 10 may be determined basically and that indications of deviations may also be output to the treating person.

It is also to be understood that the number of sensor fields and their arrangement is not limited to the example illustrated herein; rather, any plurality of sensors may be used in any arrangement, without leaving the scope of the invention.

The invention claimed is:
1. A light curing device comprising
a light source that is arranged in the light curing device, the light source comprising a plurality of mutually adjacent chips which are arranged next to one another, a light guiding element extending in front of the light source comprising at least one sensor, which is sensitive to light in the emission wavelength range of the light source, and a control device for controlling the light source during a polymerization process, the sensor being connected to the control device, characterized in that the control device continuously or at least periodically monitors the output signal of the sensor during the polymerization process and adapts the light output and/or the polymerization time in the event of a change, wherein the control device adds up the reflected radiation detected via the light exit surface (10) and/or the change in order to calculate a possible location deviation, wherein the light exit surface of the light guide has a cross-sectional area of more than 1 cm$^2$ and ensures uniform output over an entire transversal extension, and wherein the at least one sensor comprises a plurality of sensors having a sensitivity field arranged at an outer circumference of the light-emitting surface.

2. The light curing device as claimed in claim 1, characterized in that the control device detects movements of the light curing device relative to an inhomogeneous surface by means of the reflected radiation which is detected by the sensors and increases the light output and/or the polymerization time when the reflected radiation is changed compared to an initial value.

3. The light curing device as claimed in claim 1, characterized in that the entire light exit surface of the light guide is available as a reception surface for the reflected radiation and that the reflected radiation is fed to the sensors at an end of the light guide.

4. The light curing device as claimed in claim 3, characterized in that the light exit surface is circular, light exit surface of the light guide is available as a reception surface for the reflected radiation and that the reflected radiation is fed to the sensors at the other end of the light guide.

5. The light curing device as claimed in claim 1, characterized in that the control device calculates the location deviation which relates to a deviation of the location transverse to an axis of a light guide of the light curing device, or transverse to a normal of the light exit surface.

6. The light curing device as claimed in claim 1, characterized in that the control device calculates the location deviation which relates to a deviation of the location in the direction of the normal of the light exit surface.

7. The light curing device as claimed in claim 1, characterized in that the control device calculates the location deviation which comprises a deviation of the angle of the normal of the light exit surface relative to the surface to be irradiated.

8. The light curing device as claimed in claim 1, characterized in that the control device comprises a threshold value mode in which the output signal of the sensors is detected when the light source is turned on without reflection and defined as a zero signal.

9. The light curing device as claimed in claim 1, characterized in that the control device processes the reflected radiation detected by the sensors as a set value when the light source is turned on with nominal output and when the light exit surface of the light guide is directed to a dental restoration or a respective surface, and correspondingly regulates the light output and/or the polymerization time correspondingly to this set value.

10. The light curing device as claimed in claim 1, characterized in that the sensors are arranged next to the chips and every sensor is spaced apart equally from two chips.

11. The light curing device as claimed in claim 1, characterized in that every chip comprises at least one reflector and in that the sensor(s) is/are arranged outside of and adjacent the reflector.

12. The light curing device as claimed in claim 11, characterized in that the sensor(s) is/are arranged proximate the reflector.

13. The light curing device as claimed in claim 1, characterized in that the radiation emitted from the light exit surface of the light guide is substantially homogeneous and in that the output of the light curing device is increased and/or the polymerization cycle is prolonged, or optionally the light curing device is turned off, when at least one part of the reflected radiation outside of the light exit surface is led past the latter and not detected by the sensors when the light exit surface is inclined relative to the reflection surface of the object to be polymerized.

14. The light curing device as claimed in claim 1, characterized in that the control device detects a value of the output signal of the sensor at a predetermined point in time after the start of the polymerization cycle and compares it with a set value and turns off the light curing device when the set value is exceeded or undercut by a predetermined degree.

15. The light curing device as claimed in claim 14, characterized in that the control device detects the value of the output signal of the sensor at 50 milliseconds after the start of the polymerization cycle.

16. The light curing device as claimed in claim 1, characterized in that the control device changes the light output and/or reduces the polymerization time when the output signal is increased.

17. The light curing device as claimed in claim 1, characterized in that the output signal of the sensor is detected by the control device exclusively during the polymerization cycle and in that a Gaussian curve of the sensitivity spectrum of the sensor covers an emission maximum of the light source, even if chips with different emission maxima are used.

18. The light curing device as claimed in claim 1, characterized in that the control device continues the polymerization cycle, either without or after an adaptation of the light output and/or the polymerization time, when the effective light output detected by the sensor deviates by less than a predetermined degree.

19. The light curing device as claimed in claim 1, characterized in that when starting the polymerization cycle and/or in a calibration cycle before the start of the polymerization cycle the output signal of the at least one sensor is detected and stored as a reference value, and in that the light output and/or the polymerization time is adapted when the output signal changes relative to the reference value.

20. The light curing device as claimed in claim 19, characterized in that the light output and/or the polymerization time is adapted based on a hysteresis or a threshold value of the change.

21. The light curing device as claimed in claim 1, characterized in that at least one sensor comprises a spectral sensitivity maximum at one wavelength of light and at least one further sensor comprises a spectral sensitivity maximum at a further wavelength of light and in that from the change of the output signals of these two sensors a color alteration of the dental material to be irradiated is detected by the control device.

22. The light curing device as claimed in claim 1, wherein the change comprises a reduction of the output signal and the light curing device is a hand-held device.

\* \* \* \* \*